United States Patent
Tamura et al.

(10) Patent No.: US 10,338,382 B2
(45) Date of Patent: Jul. 2, 2019

(54) IN-VEHICLE DISPLAY SYSTEM

(71) Applicant: Alpine Electronics, Inc., Tokyo (JP)

(72) Inventors: Wataru Tamura, Iwaki (JP); Tsuyoshi Kimura, Iwaki (JP); Kenji Shida, Iwaki (JP); Yu Watanabe, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/958,474

(22) Filed: Apr. 20, 2018

(65) Prior Publication Data
US 2019/0025577 A1 Jan. 24, 2019

(30) Foreign Application Priority Data
Jul. 20, 2017 (JP) .................... 2017-141241

(51) Int. Cl.
G02B 27/01 (2006.01)
B60K 35/00 (2006.01)
B60W 50/08 (2012.01)

(52) U.S. Cl.
CPC .............. *G02B 27/01* (2013.01); *B60K 35/00* (2013.01); *B60W 50/082* (2013.01); *G02B 27/0179* (2013.01); *B60K 2350/2052* (2013.01); *G02B 2027/0183* (2013.01)

(58) Field of Classification Search
CPC ............... G02B 27/01; G02B 27/0179; G02B 2027/0181; G02B 2027/0183; B60K 35/00; B60K 2350/2052; B60W 50/082
See application file for complete search history.

(56) References Cited

U.S. PATENT DOCUMENTS

| | | | |
|---|---|---|---|
| 2010/0220204 A1* | 9/2010 | Fruehauf | H04N 5/2226 348/222.1 |
| 2016/0339915 A1* | 11/2016 | Kuwahara | B60W 10/20 |
| 2017/0102550 A1* | 4/2017 | Ponomarev | G02B 27/0179 |

FOREIGN PATENT DOCUMENTS

| | | |
|---|---|---|
| JP | 2015-054628 A | 3/2015 |
| JP | 2016-101805 A | 6/2016 |

* cited by examiner

*Primary Examiner* — Ryan D Howard
(74) *Attorney, Agent, or Firm* — Brinks Gilson & Lione

(57) ABSTRACT

Implementations of an in-vehicle display system may include: a first display device configured to irradiate a first area of a windshield of a vehicle with a first light constituting a first image and to display the first image as a virtual image of the first image in front of the first area; a second display device configured to display a second image as a real image in a second area of the windshield that is wider than the first area; and a control device configured to control the first display device and the second display device based on a travel state of the vehicle.

9 Claims, 10 Drawing Sheets

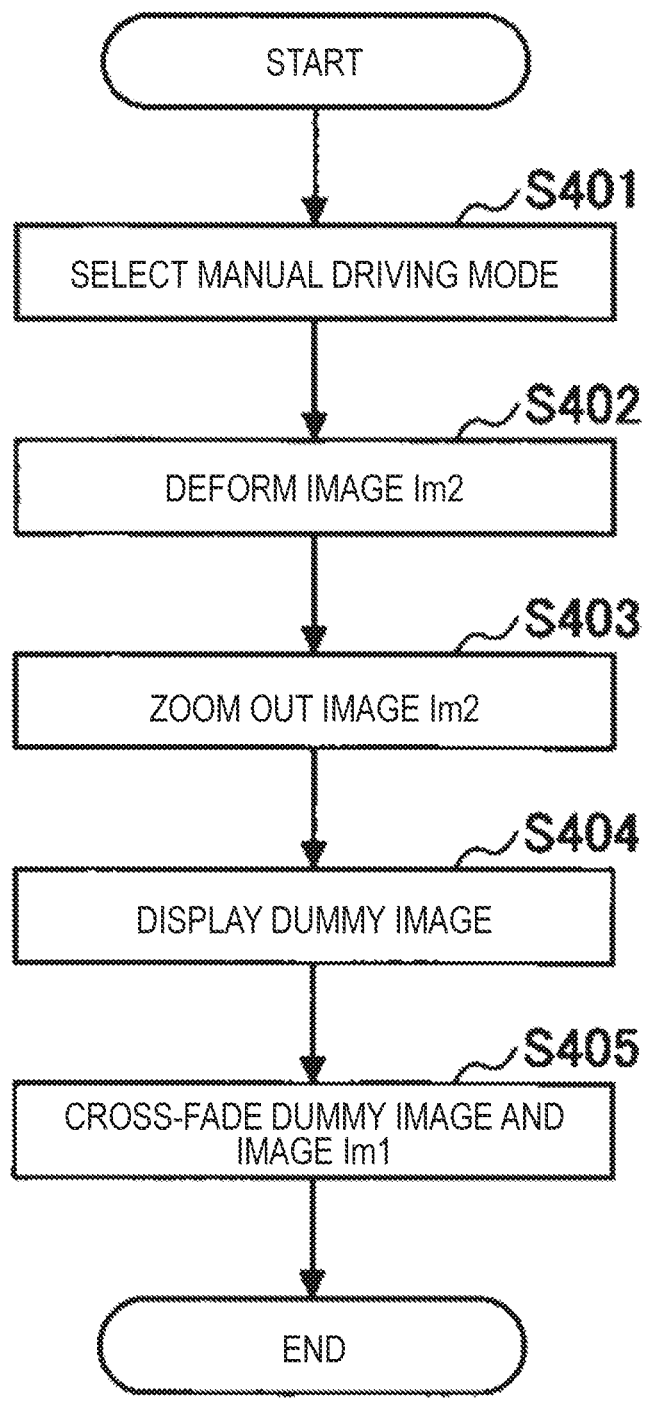

IN-VEHICLE DISPLAY SYSTEM

RELATED APPLICATIONS

The present application claims priority to Japanese Patent Appln. No. 2017-141241, filed Jul. 20, 2017, the entire disclosure of which is hereby incorporated by reference.

BACKGROUND

1. Field of the Disclosure

The present disclosure relates to an in-vehicle display system.

2. Description of the Related Art

In the related art, a heads-up display (HUD) for an in-vehicle display system is known. A HUD is a system that provides various types of information to a driver by displaying images to be overlapped on the front field of view in a windshield of a vehicle. By using the HUD, movement of the driver's line of sight and switching of the driver's focus are reduced, so that it is possible to improve safe driving. Two types of methods have been proposed for a HUD displaying an image: a method of displaying an image as a virtual image in front of a vehicle and a method of displaying an image as a real image in a windshield. (See, for example, JP 2015-54628 A).

Since the HUD in the related art is assumed to be used during the driving of the vehicle by the driver, the image is displayed in a range where a front field of view is not disturbed. As a result, the HUD in the related art cannot display an image in a wide range of the windshield, even when the vehicle is stopped.

SUMMARY

An objective of the present disclosure is to make it possible to display an image in a wide range of a windshield.

One implementation of an in-vehicle display system includes: a first display device configured to irradiate a first area of a windshield of a vehicle with a first light constituting a first image and to display the first image as a virtual image of the first image in front of the first area; a second display device configured to display a second image as a real image in a second area of the windshield that is wider than the first area; and a control device configured to control the first display device and the second display device based on a travel state of the vehicle.

According to implementations of the present disclosure, it is possible to display an image in a wide range of a windshield.

BRIEF DESCRIPTION OF THE DRAWINGS

FIG. 14 is a flowchart illustrating an example of processes when an autonomous driving mode is switched to a manual driving mode.

DETAILED DESCRIPTION OF THE DRAWINGS

Figure 1:
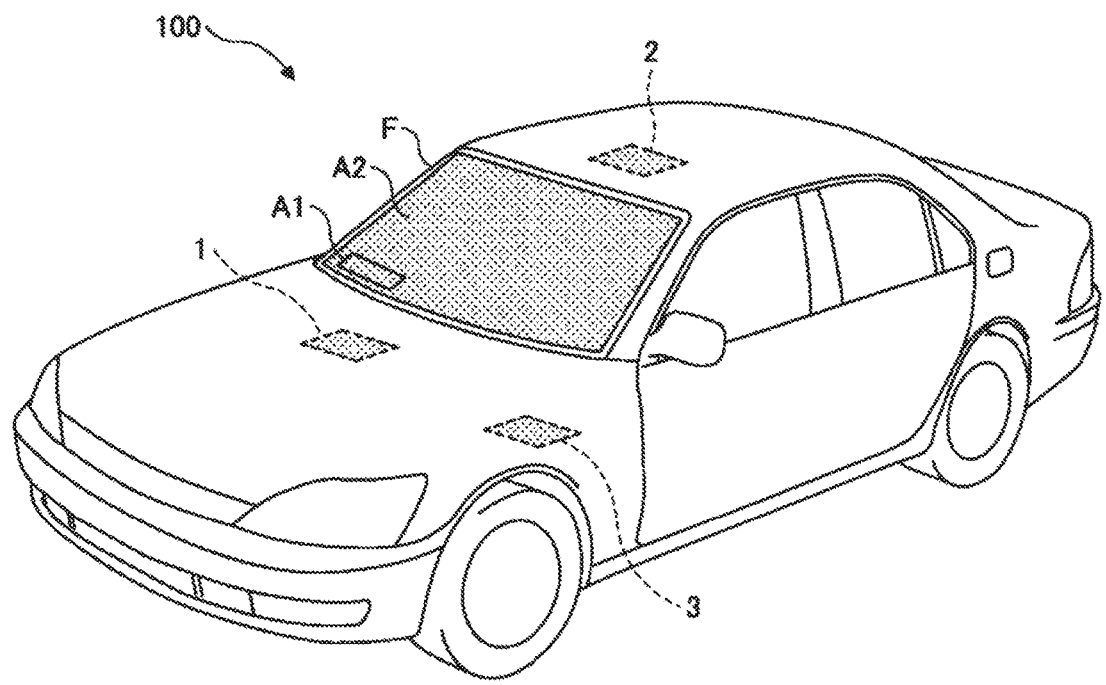
FIG. 1 is a diagram illustrating an example of an in-vehicle display system.

Hereinafter, embodiments and implementations of the present disclosure will be described with reference to the accompanying drawings. In addition, with respect to the description of the specification and the drawings, the same reference numerals denote the components having substantially the same functional configurations, and redundant description thereof is omitted.

One form of an in-vehicle display system 100 will be described with reference to FIGS. 1 to 11. The in-vehicle display system 100 is a display system mounted on a vehicle that displays an image as a virtual image or a real image using a windshield of the vehicle. Hereinafter, the vehicle has two travel states of a manual driving mode (first travel state) in which a driver manually drives the vehicle and an autonomous driving mode (second travel state) in which the vehicle autonomously travels to a destination.

FIG. 1 is a diagram illustrating an example of the in-vehicle display system 100. The in-vehicle display system 100 in FIG. 1 includes a first display device 1, a second display device 2, and a control device 3.

The first display device 1 is provided inside an instrument panel and irradiates a first area A1 of the windshield F with a first light constituting a first image Im1 and displays the first image Im1 as a virtual image in front of the first area A1. The first image Im1 is an image that provides the state of the vehicle to the driver and is displayed during the interval when the driver is driving the vehicle, that is, when the manual driving mode is selected. As the first image Im1, a speedometer, a tachometer, a guidance display in the traveling direction, road information, and the like are displayed. The first area A1 is an area that is set in advance as an area irradiated with the first light and is set according to a criterion of the front field of view so as not to disturb the front field of view of the driver.

Figure 2:
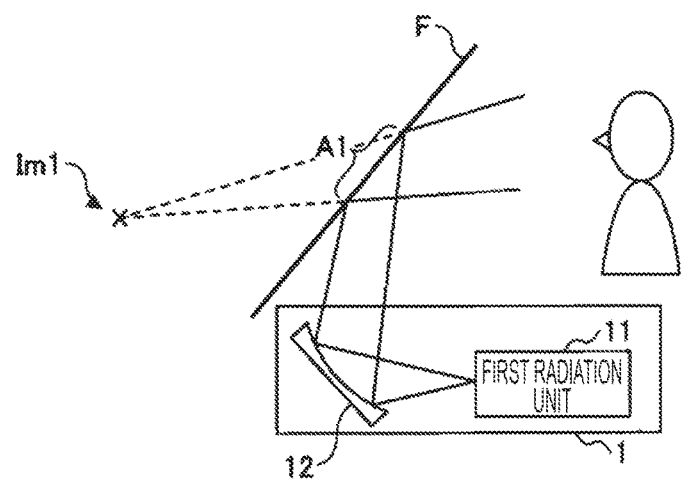
FIG. 2 is a diagram illustrating an example of a first display device.

FIG. 2 is a diagram illustrating an example of the first display device 1. The first display device 1 in FIG. 2 includes a first radiation unit 11 and a first optical system 12. The first radiation unit 11 is a projector that radiates the first light. The first radiation unit 11 is, for example, a liquid crystal display that displays the first image Im1, but the first radiation unit is not limited thereto. The first optical system 12 is an optical system that reflects the first light radiated by the first radiation unit 11 and irradiates the first area A1 with the first light at a predetermined angle. In the example of FIG. 2, the first optical system 12 is a concave mirror, but the first optical system is not limited thereto. The first optical system 12 may be configured with a plurality of lenses and mirrors.

As illustrated in FIG. 2, the first optical system 12 irradiates the first area A1 of the windshield F with the first light radiated by the first radiation unit 11 at a predetermined angle, so that a virtual image of the first image Im1 is formed in front of the first area A1. Therefore, the first image Im1 is displayed in front of the first area A1 to be overlapped on the front field of view of the vehicle.

Figure 3:
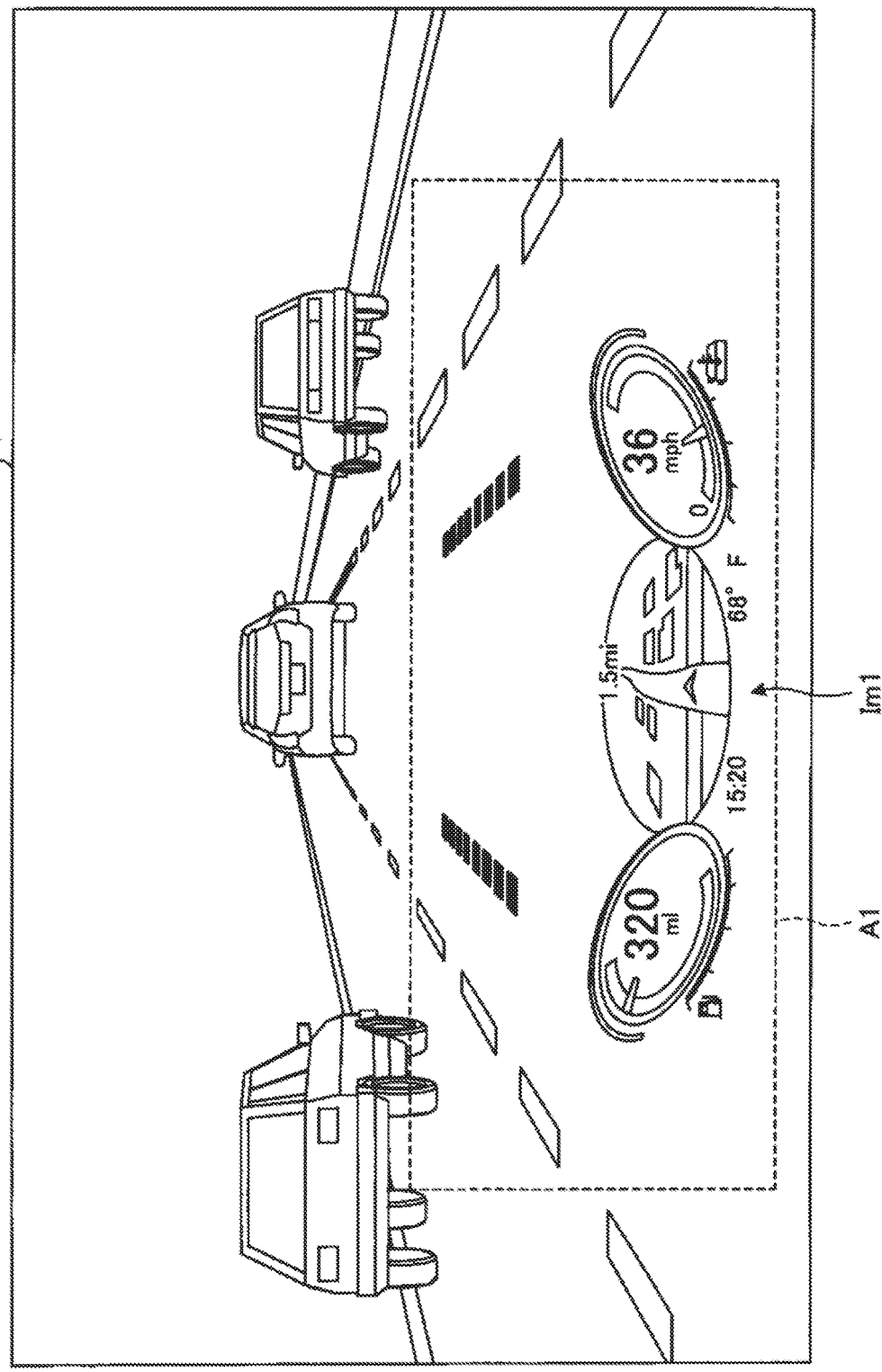
FIG. 3 is a diagram illustrating an example of a first image viewed from a driver.

FIG. 3 is a diagram illustrating an example of the first image Im1 as viewed from the driver. In the example of FIG. 3, a speedometer, a tachometer, a guidance display, and the like are displayed as the first image Im1. As illustrated in FIG. 3, the virtual image of the first image Im1 is formed in front of the vehicle, so the first image Im1 is displayed to be overlapped on the front field of view of the vehicle.

The configuration of the first display device 1 is not limited to the example of FIG. 2. In some implementations, the first image Im1 may be displayable when the autonomous driving mode is selected or may be displayable before the selection of the travel state of the vehicle (during the stop of the vehicle).

The second display device 2 is a display device that is provided on the lower surface of the ceiling of the vehicle. The second display device 2 irradiates the second area A2 of the windshield F with the second light constituting the second image Im2 and displays the second image Im2 as a real image in the second area A2. The second image Im2 is an image displayed during the interval when the driver is not driving the vehicle, that is, when the autonomous driving mode is selected. As the second image Im2, a manipulation screen, an execution screen, and the like of an in-vehicle application are displayed. The in-vehicle applications may applications for viewing movies and television, game applications, Internet browsers, and the like. During the interval when the driver is not driving the vehicle, the second image Im2 is displayed in the second area A2, so that the driver can watch movies and television, play games, and browse websites.

The second area A2 is an area set in advance as an area which is irradiated with the second light and is set to be wider than the first area A1 and to include the first area A1 so that the user (driver and passenger) can easily use the application. Since the driver does not drive the vehicle during the autonomous driving mode, the second area A2 can be set without the restriction of a criterion of the front field of view. The area of the second area A2 is preferably 70% or more of the area of the windshield F so that the user can easily use the application.

Figure 4:
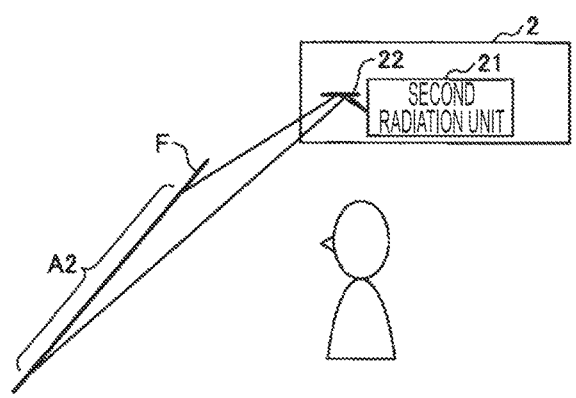
FIG. 4 is a diagram illustrating an example of a second display device.

FIG. 4 is a diagram illustrating an example of the second display device 2. The second display device 2 in FIG. 4 includes a second radiation unit 21 and a second optical system 22. The second radiation unit 21 is a projector that radiates the second light. The second radiation unit 21 is, for example, a liquid crystal display displaying the second image Im2, but the second radiation unit is not limited thereto. The second optical system 22 is an optical system that reflects the second light radiated by the second radiation unit 21 and irradiates the second area A2 with the second light at a predetermined angle. In the example of FIG. 4, the second optical system 22 is a mirror, but the second optical system is not limited to this. The second optical system 22 may be configured with a plurality of lenses and mirrors.

As illustrated in FIG. 4, the second optical system 22 irradiates the second area A2 of the windshield F with the second light radiated by the second radiation unit 21 at a predetermined angle, so that a real image of the second image Im2 is formed in the second area A2. Therefore, the second image Im2 is displayed in the second area A2. The second area A2 serves as a screen for displaying the second image Im2. Therefore, in some implementations, in displaying the second image Im2, the second area A2 is controlled so as to increase the reflectance.

For example, as a method for increasing the reflectance of the second area A2, there is considered a method of providing a transparent film screen that becomes white by applying a voltage to the second area A2. The film screen may be attached to the surface of the windshield F or may be provided inside the windshield F having a double structure. In displaying the second image Im2, the film screen is turned to white by applying a voltage to the film screen, and thus, the reflectance of the second area A2 can be increased, so that the second image Im2 can be easily seen.

As a method for increasing the reflectance of the second area A2, there is considered a method of allowing dew condensation to occur in the second area A2 by cooling the second area A2 by blowing air from a defogger or an air conditioner. In displaying the second image Im2, the dew condensation is allowed to occur in the second area A2, and thus, the reflectance of the second area A2 can be increased, so that the second image Im2 can be easily seen.

Figure 5:
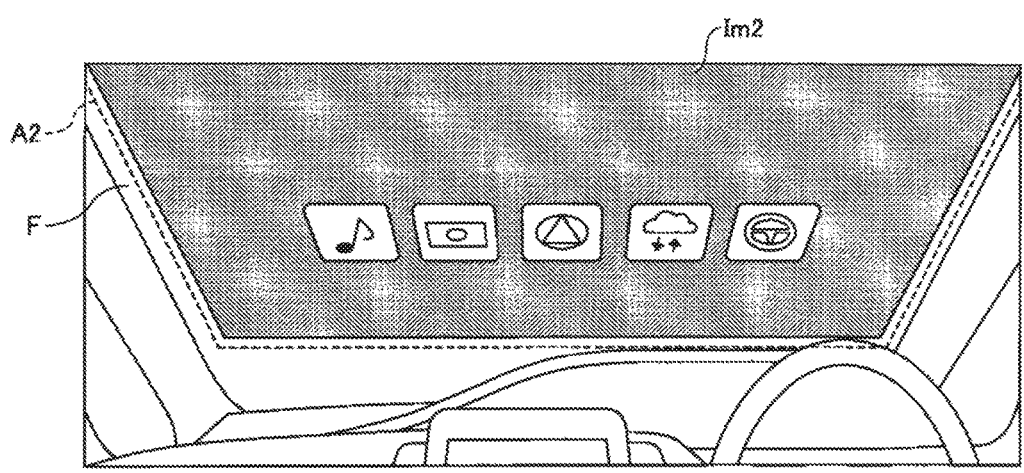
FIG. 5 is a diagram illustrating an example of a second image viewed from a driver.

FIG. 5 is a diagram illustrating an example of the second image Im2 viewed from the driver. In the example of FIG. 5, the second area A2 is set substantially over the entire plane of the windshield F, and as the second image Im2, an application selection screen on which icons of a plurality of applications are displayed is displayed. By using the manipulation device of the in-vehicle application, the user can use the desired application among the applications displayed in the selection screen. The manipulation device is, for example, an input device (a touch panel or a hardware button) of a navigation device mounted on the instrument panel, but the manipulation device is not limited thereto. As a manipulation device, a dedicated input device capable of gesture input and voice input may be mounted on the vehicle.

The configuration of the second display device 2 is not limited to the example of FIG. 4. In some implementations, the second image Im2 may be displayable before the selection of the travel state of the vehicle (during the stop of the vehicle). In some implementations, the second display device 2 may be provided inside the instrument panel or may be formed integrally with the first display device 1.

The control device 3 is a device that controls the overall operation of the in-vehicle display system 100 and is connected to the first display device 1 and the second display device so as to be capable of wired or wireless communication. In some implementations, the control device 3 is, for example, an electronic control unit (ECU), but the control device is not limited thereto. The control device 3 can be provided at an arbitrary position of the vehicle.

The control device 3 controls the first display device 1 and the second display device 2 based on the state of the vehicle. More specifically, when the vehicle is in the manual driving mode, the control device 3 allows the first display device 1 to display the first image Im1. On the other hand, when the vehicle is in the autonomous driving mode, the control device 3 allows the second display device 2 to display the second image Im2. The control by the control device 3 will be described in detail later.

Next, processes executed by the in-vehicle display system 100 will be described. Hereinafter, processes when the manual driving mode is switched to the autonomous driving mode and processes when the autonomous driving mode is switched to the manual driving mode will be respectively described.

Figure 6:
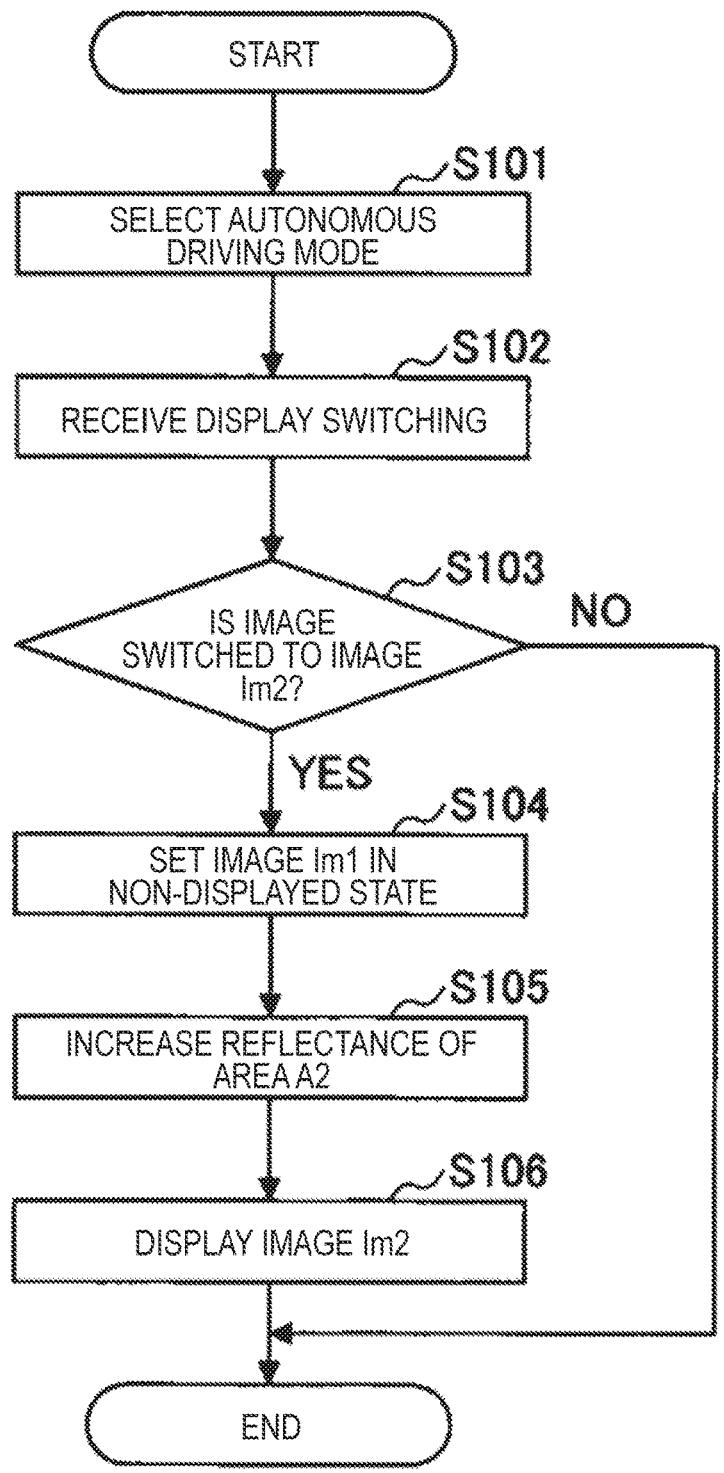
FIG. 6 is a flowchart illustrating an example of processes when a manual driving mode is switched to an autonomous driving mode.

FIG. 6 is a flowchart illustrating an example of processes when the manual driving mode is switched to the autonomous driving mode. At the start of the processes in FIG. 6, it is assumed that the manual driving mode is selected by the driver, and the first image Im1 is displayed in the first area A1 similarly to the example of FIG. 3.

First, the driver inputs a destination and the like using an input device of the navigation device and selects an autonomous driving mode (step S101). When the autonomous driving mode is selected, the vehicle starts to travel autonomously. In addition, the control device 3 receives display switching from the first image Im1 to the second image Im2 (step S102).

In a case where the user has not used the manipulation device to select display switching (NO in step S103), the control device 3 ends the processes. In this case, the first display device 1 continues to display the first image Im1.

On the other hand, when the user selects the display switching using the manipulation device (YES in step S103), the control device 3 allows the first display device 1 to end the display of the first image Im1, and the first image Im1 is in a non-displayed state (step S104).

Next, the control device 3 increases the reflectance of the second area A2 by applying a voltage to the film screen or by allowing dew condensation to occur by a defogger or an air conditioner (step S105).

Subsequently, the control device 3 allows the second display device 2 to irradiate the second light and to display the second image Im2 in the second area A2 similarly to the example of FIG. 5 (step S106). After that, the user can use the in-vehicle application on the second area A2 by manipulating the manipulation device.

Figure 7:
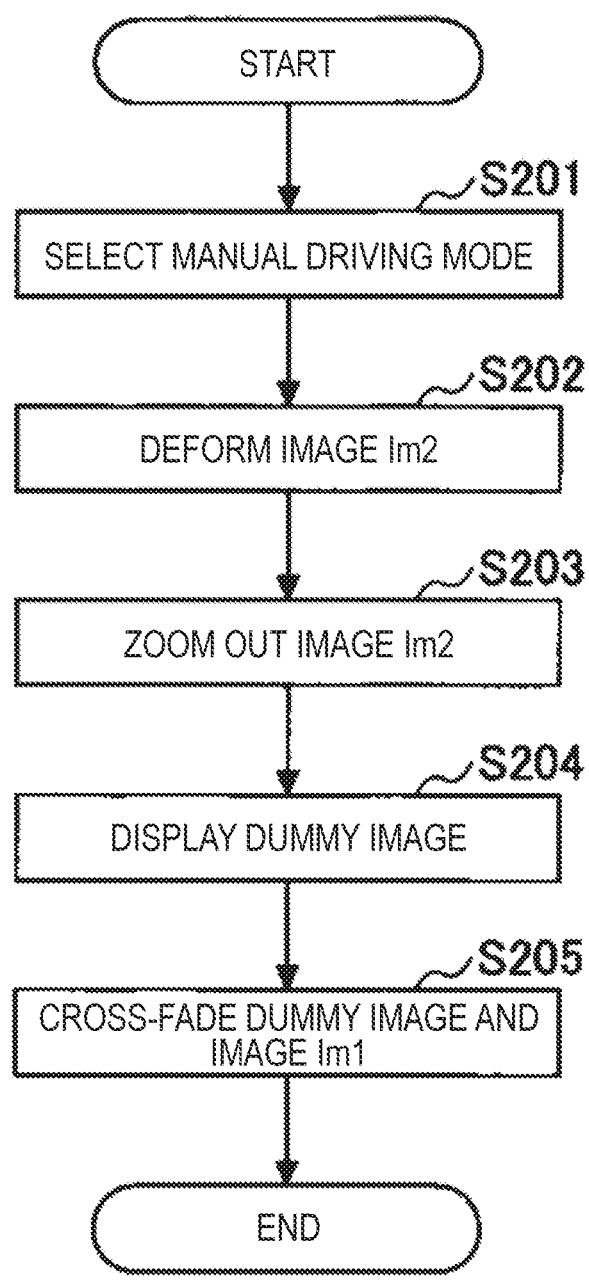
FIG. 7 is a flowchart illustrating an example of processes when an autonomous driving mode is switched to a manual driving mode.

FIG. 7 is a flowchart illustrating an example of processes when the autonomous driving mode is switched to the manual driving mode. FIGS. 8 to 11 are diagrams describing the flow of display control in FIG. 7. At the start of the processes in FIG. 7, it is assumed that the autonomous driving mode is selected by the driver, and the second image Im2 is displayed in the second area A2 similarly to the example of FIG. 5.

Figure 8:
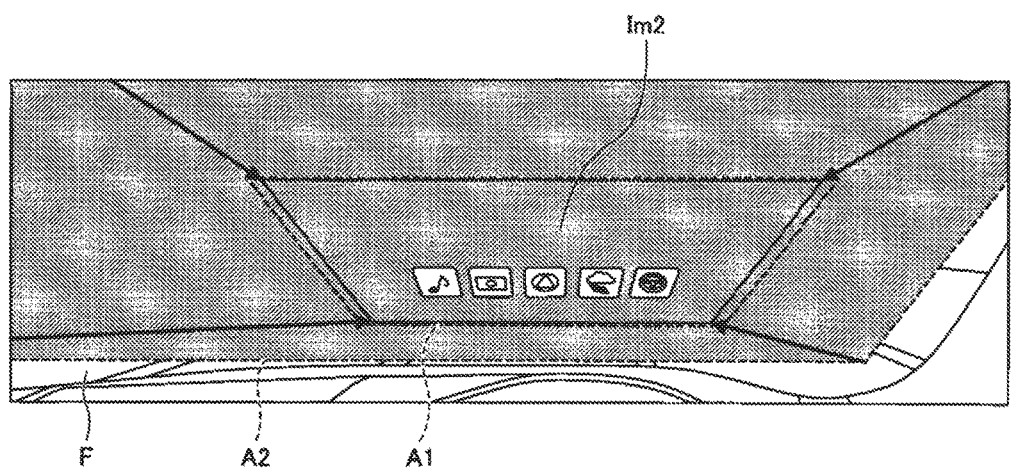
FIG. 8 is a diagram describing a flow of display control of FIG. 7.

First, the driver selects the manual driving mode using the input device or the like of the navigation device (step S201). When the manual driving mode is selected, as illustrated in FIG. 8, the control device 3 allows the second display device 2 to deform the second image Im2 so that the second image Im2 is included in the first area A1 (step S202). Thus, the driver accustomed to the display in the second area A2 can be allowed to be accustomed to the display in the first area A1. That is, the driver's field of view can be moved from the second area A2 to the first area A1.

Figure 9:
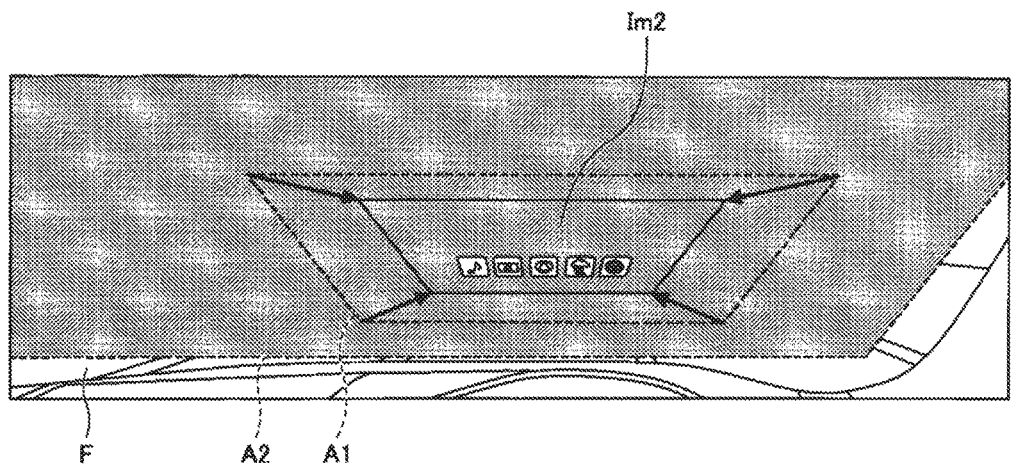
FIG. 9 is a diagram describing a flow of display control of FIG. 7.

Next, as illustrated in FIG. 9, the control device 3 allows the second display device 2 to zoom out the second image Im2 toward the front of the vehicle (step S203). In this manner, by zooming out the second image Im2, the eyes of the driver accustomed to a near viewpoint can be allowed to be accustomed to a far viewpoint by watching the second image Im2 displayed as the real image in the second area A2.

Figure 10:
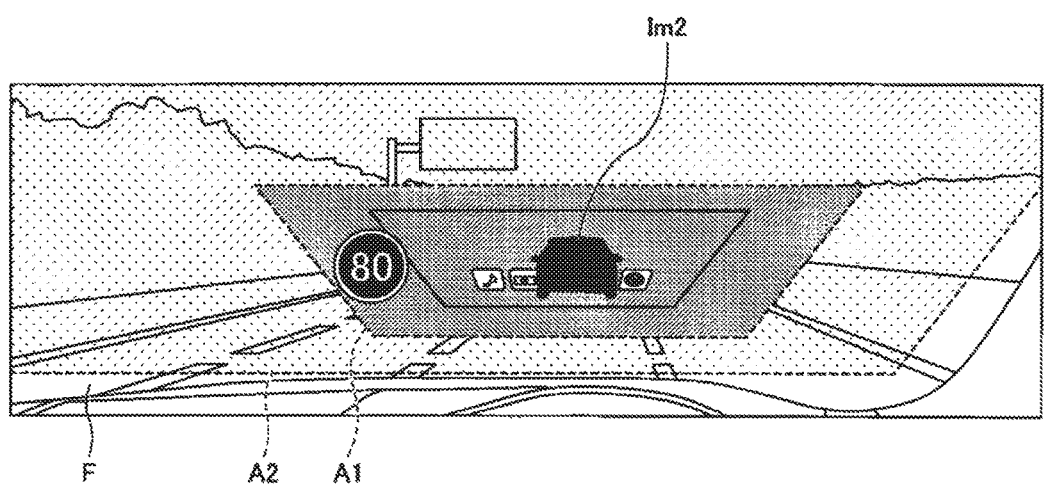
FIG. 10 is a diagram describing a flow of display control of FIG. 7.

Subsequently, as illustrated in FIG. 10, the control device 3 allows the second display device 2 to display a dummy image as the second image Im2 (step S204). The dummy image is an image schematically illustrating an object (a vehicle, a road sign, a road marking, or the like) included in the front field of view of the vehicle and is displayed at a position corresponding to the position of the object in the front field of view. In addition, the dummy image is displayed with a size corresponding to the size of the object in the front field of view. The control device 3 may detect the object based on an image captured by an imaging device that captures an image of the front of the vehicle, generate a dummy image corresponding to the object, and determine the position and the size for displaying the dummy image. In the example of FIG. 10, as a dummy image, an image schematically illustrating a vehicle traveling forward is displayed. In this manner, the dummy image is displayed, so that the driver can be accustomed to the sense of distance between the driver and the object existing in front of the vehicle.

In some implementations, the dummy image may be displayed after the zooming-out of the original second image Im2 ends or may be displayed during the zooming-out of the original second image Im2 as in the example of FIG. 10. In some implementations, an image indicating road information may be displayed together with the dummy image. In the example of FIG. 10, an image indicating a speed limit is displayed as the image indicating the road information. In some implementations, in displaying the dummy image, the control device 3 ends the application of the voltage to the film screen or removes dew condensation occurring in the second area A2 by a defogger or an air conditioner, so that the reflectance of the second area A2 is decreased. Therefore, it is possible for the driver to see the front of the vehicle.

Figure 11:
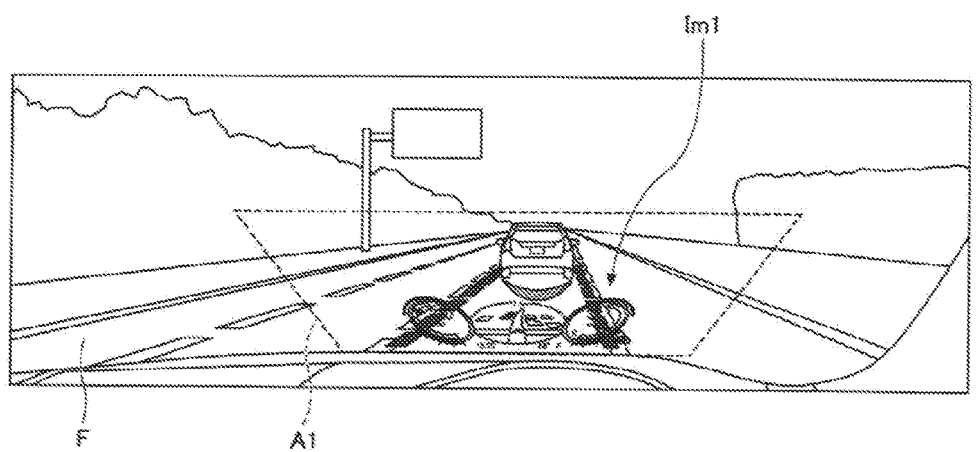
FIG. 11 is a diagram describing a flow of display control of FIG. 7.

After that, as illustrated in FIG. 11, the control device 3 allows the first display device 1 and the second display device 2 to cross-fade the dummy image displayed as the second image Im2 and the first image Im1 (step S205). More specifically, the control device 3 allows the second display device 2 to fade out the dummy image displayed as the second image Im2 and to end the display of the second image Im2. In addition, the control device 3 allows the second display device 2 to fade in the first image Im1. Therefore, it is possible to smoothly switch the display of the first image Im1 by the first display device 1 and the display of the second image Im2 by the second display device 2.

After that, the driver starts manual driving at a predetermined timing. Thus, the driver can drive the vehicle while watching the first image Im1 displayed in the first area A1.

As described above, in some implementations, during the manual driving mode, the first image Im1 can be displayed in the first area A1 of the windshield F, and during the autonomous driving mode, the second image Im2 can be displayed in the wide area (second area A2) of the windshield F. Therefore, during the autonomous driving mode, the user can watch movies and television, play games, or browse websites on a large screen (the second area A2) without the restriction of a criterion of the front field of view. As a result, a degree of user satisfaction can be improved.

In addition, in some implementations, when the second image Im2 is switched to the first image Im1, the field of view, the viewpoint, and the sense of distance of the driver accustomed to the second image Im2 are sequentially adjusted so as to correspond to the first image Im1. Therefore, the driver accustomed to the second image Im2 can be allowed to be smoothly accustomed to the first image Im1, so that the driver's confusion caused by switching from the second image Im2 to the first image Im1 is suppressed, and thus, the driver can be allowed to safely start the manual driving.

In addition, in some implementations, at least a portion of the above-described steps S202 to S204 may be omitted, or the order may be changed. For example, it is considered that step S204 is omitted in a case where the imaging device that captures an image of the front of the vehicle is not mounted on the vehicle.

In some implementations, the processes of FIG. 7 may be executed in a case where the manual driving mode is selected by the driver before the selection of the travel state of the vehicle (during the stop of the vehicle) and during the display of the second image Im2.

Another form of an in-vehicle display system 100 will be described with reference to FIGS. 12 to 14. The in-vehicle display system 100 includes a transparent display as the second display device 2. Other configurations may be the same as those described above. Hereinafter, differences from the above-described implementations will be described.

The second display device 2 is a display device including a transparent display 23 that displays the second image Im2 as a real image in the second area A2 of the windshield F. The transparent display 23 may be an organic electro luminescence (EL) display or a liquid crystal display. The second area A2 corresponds to the area where a transparent display 23 is provided.

Figure 12:
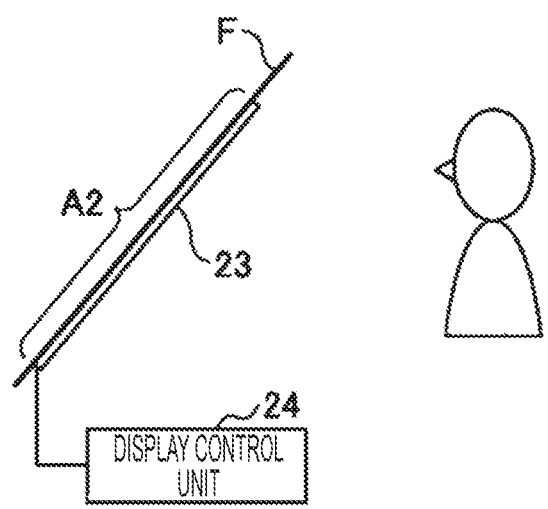
FIG. 12 is a diagram illustrating an example of a second display device.

FIG. 12 is a diagram illustrating an example of the second display device 2. The second display device 2 in FIG. 12 includes a transparent display 23 and a display control unit 24. The transparent display 23 is a transparent display that displays an image by applying a voltage. As in the example of FIG. 12, the transparent display 23 may be provided on the surface of the windshield F or may be provided inside the windshield F having a double structure. The display control unit 24 is a device that applies a voltage to the transparent display 23 and controls the display of image by the transparent display 23. The display control unit 24 may be mounted inside the instrument panel or may be included in the control device 3. It is preferable that, when displaying the second image Im2, the second display device 2 displays a portion (background) other than the second image Im2 in the second area A2 in a single color (white or black) so that the second image Im2 can be allowed to easily seen.

Next, processes executed by the in-vehicle display system 100 will be described. Hereinafter, processes when the manual driving mode is switched to the autonomous driving mode and processes when the autonomous driving mode is switched to the manual driving mode will be described, respectively.

Figure 13:
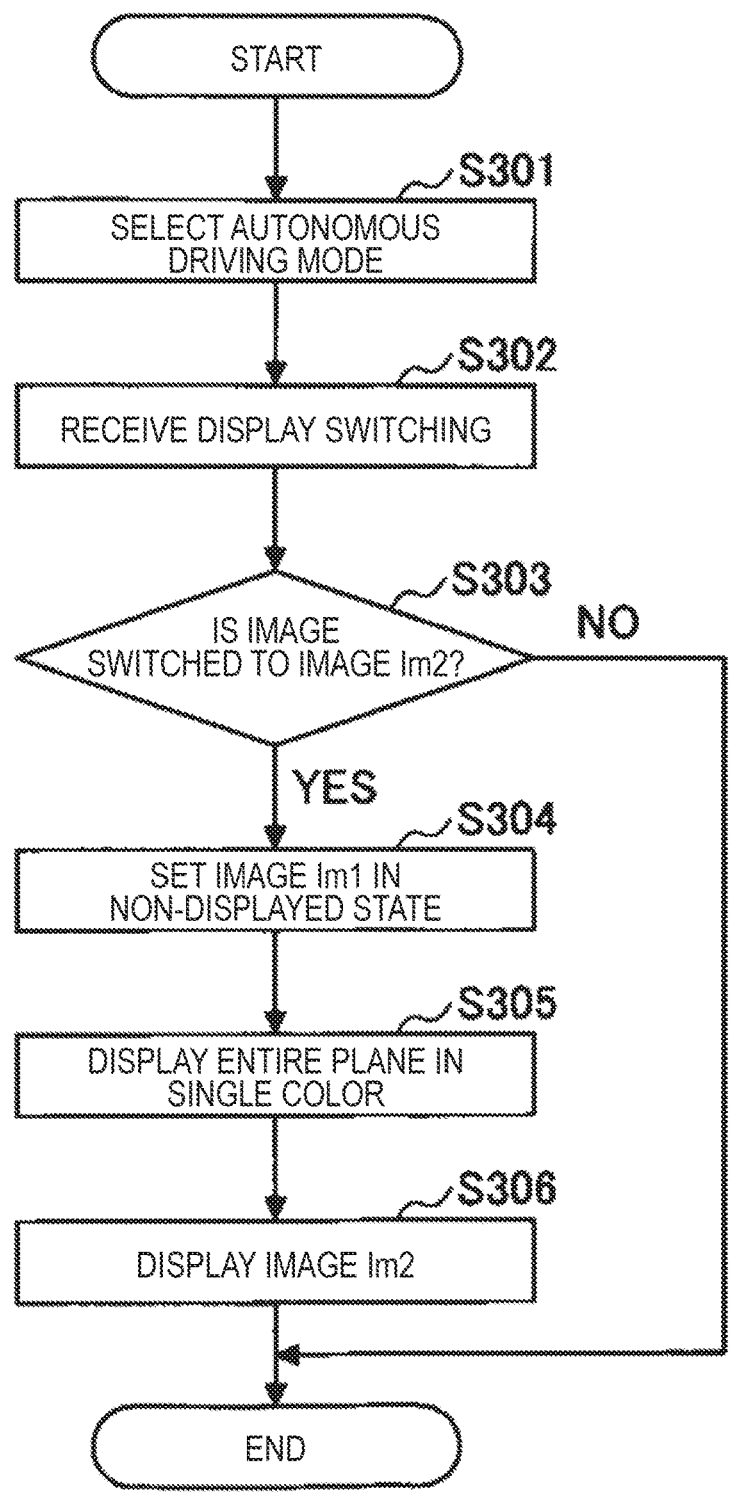
FIG. 13 is a flowchart illustrating an example of processes when a manual driving mode is switched to an autonomous driving mode.

FIG. 13 is a flowchart illustrating an example of processes when the manual driving mode is switched to the autonomous driving mode. Steps S301 to S304 in FIG. 13 are the same as steps S101 to S104 in FIG. 6. Hereinafter, steps S305 and S306 will be described.

When display of the first image Im1 by the first display device 1 ends, the control device 3 allows the second display device 2 to display the entire plane of the transparent display 23 in a single color (step S305).

Next, in the state where the background is displayed in a single color, the control device 3 allows the second image Im2 to be displayed in the second area A2 (step S306). After that, the user can use the in-vehicle application on the second area A2 by manipulating the manipulation device.

FIG. 14 is a flowchart illustrating an example of processes when the autonomous driving mode is switched to the manual driving mode. Steps S401 to S403 and S405 in FIG. 14 are the same as steps S201 to S203 and S205 in FIG. 7. Hereinafter, step S404 will be described.

When the second display device 2 is allowed to zoom out the second image Im2, the control device 3 allows the second display device 2 to display a dummy image as the second image Im2 (step S404). At this time, the control device 3 may allow the second display device 2 to end monochrome display of the background of the transparent display 23. This makes it possible for the driver to see the front of the vehicle.

As described above, in the second form of the in-vehicle display system, the same display control as that of the first form of the in-vehicle display system can be implemented using the transparent display 23 as the second display device 2. Therefore, a degree of user satisfaction can be improved, and the driver can safely start the manual driving.

In addition, in this form of the in-vehicle display system, at least a portion of the above-described steps S402 to S404 may be omitted, or the order may be changed. For example, it is considered that step S404 is omitted in a case where the imaging device that captures an image of the front of the vehicle is not mounted on the vehicle.

In some implementations, the processes of FIG. 14 may be executed in a case where the manual driving mode is selected by the driver before the selection of the travel state of the vehicle (during the stop of the vehicle) and during the display of the second image Im2.

The present disclosure is not limited to the configurations illustrated in the above forms and implementations, such as combinations with other elements, and the like. With respect to these points, the forms and implementations can be changed within a scope without departing from the spirit of the present disclosure and can be appropriately determined according to application forms.

It is therefore intended that the foregoing detailed description be regarded as illustrative rather than limiting, and that it be understood that it is the following claims, including all equivalents, that are intended to define the spirit and scope of this disclosure.

What is claimed is:

1. An in-vehicle display system comprising:
a first display device configured to irradiate, while a vehicle is operating in a manual driving mode, a first area of a windshield of the vehicle with a first light constituting a first image and to display the first image as a virtual image of the first image in front of the first area;
a second display device configured to display, while the vehicle is operating in an autonomous driving mode, a second image as a real image in a second area of the windshield that is wider than the first area; and
a control device configured to control the first display device and the second display device based on whether the vehicle is operating in the manual driving mode or the autonomous driving mode.

2. The in-vehicle display system according to claim 1, wherein, when switching the second image to the first image, the control device is configured to deform the second image so as to be included in the first area.

3. The in-vehicle display system according to claim 1, wherein, when switching the second image to the first image, the control device is configured to zoom-out the second image.

4. The in-vehicle display system according to claim 1, wherein, when switching the second image to the first image, the control device is configured to display a dummy image of an object included in a front field of view as the second image.

5. The in-vehicle display system according to claim 1, wherein, when switching the second image to the first image, the control device is configured to cross-fade the second image and the first image.

6. The in-vehicle display system according to claim 1, wherein the first display device includes:
   a first radiation unit configured to radiate the first light; and
   a first optical system configured to reflect the first light radiated by the first radiation unit and to perform irradiation toward the first area at a predetermined angle.

7. The in-vehicle display system according to claim 1, wherein the second display device includes:
   a second radiation unit configured to radiate a second light constituting the second image; and
   a second optical system configured to reflect the second light radiated by the second radiation unit and to perform irradiation toward the second area at a predetermined angle.

8. The in-vehicle display system according to claim 7, wherein the second area is an area where a transparent film screen is provided or an area where dew condensation occurs on the windshield.

9. The in-vehicle display system according to claim 1, wherein the second display device includes:
   a transparent display that is provided in the second area; and
   a display control unit configured to control display of the transparent display.

* * * * *